Sept. 13, 1927.
A. NYMAN
1,642,041
INDUCTOR TYPE FREQUENCY CHANGER
Filed Jan. 7, 1922
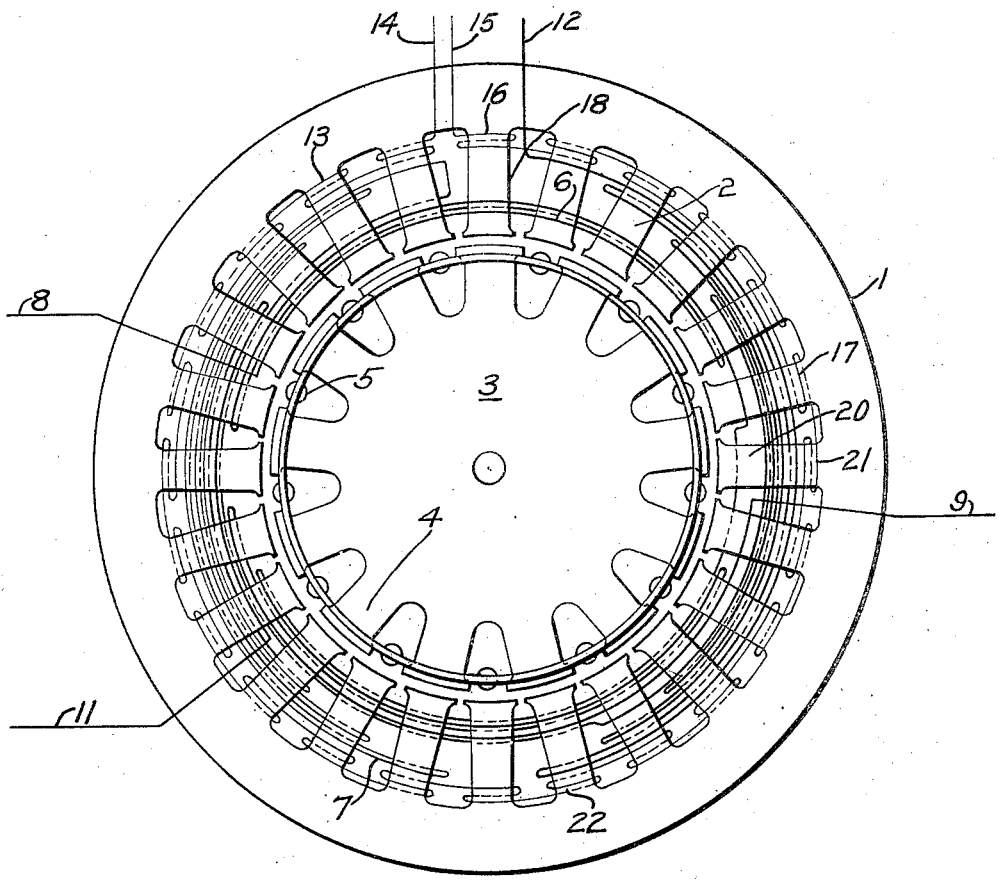
WITNESSES:
A. G. Schiefelbein.
H. L. Godfrey
INVENTOR
Alexander Nyman.
BY
Wesley G. Carr
ATTORNEY Patented Sept. 13, 1927.

1,642,041

UNITED STATES PATENT OFFICE.

ALEXANDER NYMAN, OF SWISSVALE, PENNSYLVANIA, ASSIGNOR TO WESTINGHOUSE ELECTRIC & MANUFACTURING COMPANY, A CORPORATION OF PENNSYLVANIA.

INDUCTOR-TYPE FREQUENCY CHANGER.

Application filed January 7, 1922. Serial No. 527,606.

My invention relates to dynamo-electric machines and particularly to such machines as are adapted to generate alternating currents of relatively high frequency.

An object of my invention is to provide a dynamo-electric machine wherein alternating currents of commercial frequencies are translated into currents of higher frequencies, such, for example, as are employed in wireless transmission systems.

Another object of my invention is to provide stator and rotor teeth having such relative pitches that the high-frequency currents generated by the machine are of substantially constant amplitude and frequency.

Other objects of my invention, as well as details of construction, whereby my invention may be practised, will be apparent from the following description, when taken in connection with the accompanying drawing, wherein the single figure is a view, partially structural and partially diagrammatic, of a dynamo-electric machine embodying my invention.

In the drawing is shown a stator member 1 with a plurality of inwardly projecting members or teeth 2. A rotor member 3 is mounted within the stator member 1 and is provided with a plurality of outwardly extending teeth 4. A squirrel-cage winding 5 is mounted upon the rotor teeth 4 in a manner well known in the art. The stator member 1 is provided with a single-phase induction-motor winding 7 of any desired number of poles and with an auxiliary winding 6 which is employed during the starting period. Energy may be supplied to the windings 6 and 7 by means of conductors 8—9 and 11—12, respectively. The two windings 6 and 7 may correspond to the phases of a two-phase machine or a three-phase winding.

An auxiliary winding 13 is also applied to the individual stator teeth 2. Conductors 14 and 15 serve as supply leads for the auxiliary winding 13. This winding is reversed in direction with each successive tooth and the arrangement of the stator and rotor teeth is such that the electromotive forces generated in the coils of the auxiliary winding 13, upon relative motion of the stator and rotor teeth, are accumulatively combined, as will be hereinafter explained.

In operation, the machine is operated as a squirrel-cage induction motor in accordance with well-known principles.

The generator action may be explained as follows:—

When a rotor tooth is directly under a stator tooth, the magnetic flux in that stator tooth will be a maximum, and when a rotor slot is under a stator tooth, the flux in said stator tooth will be a minimum. The flux pulsations which are thus produced in the stator teeth, upon the passage of the rotor teeth, cause the generation of alternating electromotive forces of high frequency in the high-frequency winding 13, as will be understood from a consideration of the well-known inductor alternator. Inasmuch as the flux varies in magnitude at a frequency corresponding to that of the exciting currents, the high-frequency currents generated by ordinary inductor alternators have been correspondingly modulated.

I have found that, by employing an odd number of rotor teeth per pair of poles of the low-frequency winding, and a number of stator teeth per pair of poles which is a multiple of 4, the effect of the variations in the intensity of flux at the low-frequency rate is eliminated, and high-frequency electromotive forces may be obtained which are of substantially-constant amplitude and frequency. It will be noted, in the drawing, that each coil of high-frequency winding embraces a single stator tooth. It will be understood, however, that the term "tooth" is employed to mean either a single tooth or a group of teeth treated as one.

The effect of the squirrel-cage winding 5 is to cause the low-frequency motor flux to be a substantially sinusoidally-distributed flux rotating at the synchronous speed corresponding to the low-frequency supply. The result of this is that, at any particular instant, the maximum flux possible in any stator tooth is different from the flux in any other tooth.

The high-frequency electromotive force is produced by the changes in flux caused by the passage of the rotor teeth under the stator teeth. The circumferential length of the teeth, as well as the configuration of the pole-faces, if necessary, are designed preferably in such manner as to produce sinusoidal changes in the flux. If the number of rotor teeth is large, one cycle of the high-frequency electromotive force corresponds approximately to the time between the instant in which one rotor tooth is directly beneath a stator tooth and the instant at which the next adjacent rotor tooth is underneath the same stator tooth.

Since the number of stator teeth per pair of poles is a multiple of 4, we may consider two teeth, as 18 and 20, which are separated 90 electrical degrees or one-half of the low-frequency pole-pitch apart. Since the number of rotor teeth per pair of poles is an odd number, it will be found that, whenever one of the rotor teeth is directly under one of said quadrature-related stator teeth, as 18, another rotor tooth will be either just leaving or just approaching the other stator tooth 20, the difference in displacement being equal to $\frac{1}{4}$ of the rotor pole pitch or approximately $\frac{1}{4}$ of a high-frequency cycle.

Thus, if the number of rotor teeth per pair of poles of the low-frequency winding is $$R = 2n+1,$$

where $n$ is an integer, the number of rotor teeth comprised in 90 electrical degrees of the low-frequency winding will be $$x = \frac{R}{4} = \frac{n}{2} + \frac{1}{4}$$

If $n$ is odd, $x$ equals an integer minus $\frac{1}{4}$. If $n$ is even, $x$ equals an integer plus $\frac{1}{4}$. Hence, the high-frequency electromotive force generated in the coil 16 embracing the tooth 18 is substantially 90 degrees out of phase with the high-frequency electromotive force generated in the quadrature-related coil 21, embracing the tooth 20.

We may write the equations for the low-frequency flux available at any two quadrature-related points, such as 18 and 20, as follows:—

$$\phi_{18} = \Phi \sin \omega t$$

and $$\phi_{20} = \Phi \cos \omega t$$

where $\Phi$ is the maximum flux and $\omega$ is the angular velocity of the low-frequency currents.

The change of flux through coil 16 due to the passage of rotor teeth and slots in front of stator tooth 18 is of high frequency because the number of teeth is large. This change is proportional to the flux $\phi_{18}$, which can be regarded as unchanged during the time it takes a few teeth to pass. This change, therefore, gives rise to an electromotive force proportional to $\Phi \sin \omega t$ and having a high frequency. It may, therefore, be represented by $$e_{16} = (a+jb)\Phi \sin \omega t$$

where $a+jb$ is a vector rotating at the high-frequency speed.

Now, the high-frequency electromotive force in the coil 21 is 90 degrees out of phase with that in the coil 16. A vector at right angles to $a+jb$ can be represented by $b-ja$. Moreover, the flux $\phi_{20}$, to which this electromotive force is proportional, is $\Phi \cos \omega t$. This electromotive force may, therefore, be written $$e_{21} = (b-ja)\Phi \cos \omega t.$$

Expanding these equations, we have $$e_{16} = a\Phi \sin \omega t + jb\Phi \sin \omega t$$
$$e_{21} = b\Phi \cos \omega t - ja\Phi \cos \omega t$$

in which the symbol $j$ indicates a right angle in a system of vectors rotating at the high frequency and $\omega$ is the angular velocity for the low frequency.

Hence, the absolute value of the vectorial sum of the electromotive forces generated in the two coils 16 and 21 is $$E_{16,21} = \Phi\sqrt{(a \sin \omega t + b \cos \omega t)^2 + (b \sin \omega t - a \cos \omega t)^2} = \Phi\sqrt{a^2 + b^2}$$

It will thus be seen that the electromotive forces generated in each of the coils 16 and 17 of the first quadrant will combine with the electromotive forces generated in the corresponding coils 21 and 22 of the second quadrant to produce a high-frequency electromotive force of constant amplitude, in which the low-frequency variations do not appear. Since R is odd, a little reflection will show that the electromotive forces generated in the coils of the third and fourth quadrants are in phase with the electromotive forces generated in the corresponding coils of the first and second quadrants.

It will be observed that the preceding demonstration treats $a$ and $b$ as of the same magnitude for quadrature-related teeth. This is warranted because the size and form of the machine are sufficient to cause it to run without the slip becoming large enough to cause any material ellipticity of the field. Also the resistance of the rotor is low enough to ensure this result.

While I have shown my invention embodied in a construction and circuit arrangement of particular form, it is not limited thereto, but is susceptible of many changes and modifications without departing from the spirit thereof, and I desire, therefore, that only such limitations shall be placed thereon as are set forth in the prior art or are specifically mentioned in the appended claims.

I claim as my invention:—

1. The method of generating relatively high frequency currents of substantially constant amplitude from alternating currents of relatively low frequency which consists in establishing low-frequency alternating fluxes substantially equal and having a substantially 90-degree time-phase relation with respect to the low-frequency cycle, generating from said fluxes high-frequency electromotive-forces having a substantially 90-degree phase-displacement with respect to the high-frequency cycle and causing said electromotive forces to be combined in series-circuit relation.

2. In a high-frequency generator, the combination with a yoke member, of means for establishing a rotating magnetic flux therein, a relatively rotating inductor member co-operating with said yoke member and carrying a plurality of magnetizable portions with intervening non-magnetic portions passing the adjacent portions of said yoke member, and a winding on said yoke member including pairs of electrically-connected conductors spaced approximately one-half of the distance between a north pole and a south pole of said rotating flux at any instant, said plurality of magnetizable portions being so arranged with respect to said pairs of conductors as to produce, in the conductors of each of said pairs, pulsations of flux in substantially 90° time-phase relation, one to the other.

3. In a high-frequency generator, the combination with a yoke member, of means for establishing a rotating magnetic flux therein, a relatively rotating inductor member co-operating with said yoke member and carrying an odd number of magnetizable portions per pair of poles of said flux with intervening non-magnetic portions passing the adjacent portions of said yoke member, said rotating inductor member having sufficiently small resistance to assure that the said rotating magnetic flux is substantially circular, a plurality of teeth on said adjacent portions of said yoke member and comprising pairs of teeth spaced approximately one-half of the distance between a north pole and a south pole of said rotating flux at any instant, and a winding including coils disposed on said teeth, whereby the sum of the electromotive forces generated in any pair of quadrature-related coils by reason of the passage of the magnetizable portions is of substantially constant amplitude.

4. In a high-frequency generator, the combination with a yoke member, of means for establishing a rotating magnetic flux therein, a relatively rotating inductor member co-operating with said yoke member and carrying an odd number of magnetizable portions per pair of poles of said flux with intervening non-magnetic portions passing the adjacent portions of said yoke member, a number of teeth per pair of poles on said adjacent portions of said yoke member, said member being an integral multiple of four, and a winding including serially connected coils wound in opposite directions on consecutive teeth of said yoke member.

5. In a high-frequency dynamo-electric machine, the combination with a toothed yoke member, of means for establishing a rotating magnetic flux therein, a relatively rotating toothed inductor member co-operating therewith, and a winding oppositely wound on adjacent teeth of said yoke member, the teeth of said yoke member being so arranged that for every tooth there is a quadrature-related tooth spaced therefrom substantially one-half of the pole-pitch of said flux, and the teeth of said inductor member having a tooth-pitch corresponding to an odd number of teeth per pair of poles of said flux.

6. A dynamo-electric frequency-converter for interchanging energy between currents of relatively low frequency and currents of relatively high frequency, comprising an induction motor having primary and secondary members, a low-frequency primary winding on said primary member, said primary member having a number of slots per pair of poles of said low-frequency winding, said number being an integral multiple of four, a high-frequency winding comprising conductors threading adjacent slots in opposite directions, and a closed-circuited secondary winding on said secondary member, said secondary member having a relatively large odd number of teeth per pair of poles of said low-frequency winding with intervening spaces of less permanence than said teeth.

7. In a high-frequency dynamo-electric machine, the combination with a toothed yoke member, of a single-phase low-frequency winding thereon, a relatively rotating toothed inductive member cooperating therewith, a damper winding on said inductor member, and a winding oppositely wound on adjacent teeth of said yoke member, the teeth of said yoke member being so arranged that for every tooth there is a quadrature-related tooth spaced therefrom substantially one-half of the pole-pitch of the low-frequency flux, and the teeth of said inductor member having a tooth-pitch corresponding to an odd number of teeth per pair of poles of said flux.

8. An inductive-type dynamo-electric machine having relatively movable stator and rotor members, each of said members having spaced teeth, said stator member carrying a plurality of low-frequency windings, said windings producing poles spaced an integral multiple of four stator teeth apart and said relatively rotating member having teeth spaced substantially in accordance with an odd number of teeth per pair of poles of said low-frequency windings.

9. The method of generating relatively high-frequency currents of substantially constant amplitude from alternating currents of relatively low frequency which consists in establishing low-frequency alternating fluxes substantially equal and having a substantially 90-degree time-phase relation with respect to the low-frequency cycle, generating from said respective low-frequency fluxes high-frequency electromotive forces differing in phase by a quarter of the high-frequency cycle and combining said high-frequency electromotive forces in series-circuit relation, whereby the total high-frequency electromotive forces will be of substantially constant amplitude.

In testimony whereof, I have hereunto subscribed my name this 16th day of December 1921.

ALEXANDER NYMAN.